United States Patent
Kim et al.

(10) Patent No.: US 10,547,090 B2
(45) Date of Patent: Jan. 28, 2020

(54) BATTERY CELL INCLUDING ELECTRODE LEAD CONTAINING GAS ADSORBENT

(71) Applicant: LG Chem, Ltd., Seoul (KR)

(72) Inventors: Yong Jun Kim, Daejeon (KR); Seok Koo Kim, Daejeon (KR); Seung Hyun Chung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/754,211

(22) PCT Filed: Sep. 6, 2016

(86) PCT No.: PCT/KR2016/009954
§ 371 (c)(1),
(2) Date: Feb. 21, 2018

(87) PCT Pub. No.: WO2017/099333
PCT Pub. Date: Jun. 15, 2017

(65) Prior Publication Data
US 2018/0248235 A1    Aug. 30, 2018

(30) Foreign Application Priority Data
Dec. 10, 2015 (KR) .................. 10-2015-0175545

(51) Int. Cl.
*H01M 10/052* (2010.01)
*H01M 10/52* (2006.01)
(Continued)

(52) U.S. Cl.
CPC .............. *H01M 10/52* (2013.01); *B01J 20/18* (2013.01); *B01J 20/20* (2013.01); *H01M 2/0275* (2013.01);
(Continued)

(58) Field of Classification Search
CPC . H01M 10/52; H01M 10/052; H01M 10/0525
See application file for complete search history.

(56) References Cited

U.S. PATENT DOCUMENTS 7,776,465 B1 * 8/2010 Hatazawa ........... H01M 2/0275
429/57
2004/0185330 A1   9/2004 Yamaguchi et al.
(Continued)

FOREIGN PATENT DOCUMENTS

CN    202094234 U    12/2011
CN    102473984 A    5/2012
(Continued)

OTHER PUBLICATIONS

Search report from International Application No. PCT/KR2016/009954, dated Sep. 6, 2016.
(Continued)

*Primary Examiner* — Olatunji A Godo
(74) *Attorney, Agent, or Firm* — Lerner, David, Littenberg, Krumholz & Mentlik, LLP (57) ABSTRACT

Disclosed herein is a battery cell including: an electrode assembly including an electrode tab protruding toward at least one outer periphery; a battery case including an accommodation part in which the electrode assembly is mounted; and an electrode lead connected to the electrode tab for electrical connection with an external device, wherein the electrode lead includes: a tab connection part electrically connected to the electrode tab; and a protrusion extension part extended from the tab connection part and protruding outwardly of the battery case to thereby be electrically connected to the external device, the tab connection part being coated with a gas adsorbent.

19 Claims, 5 Drawing Sheets

(51) Int. Cl.
  *B01J 20/18* (2006.01)
  *B01J 20/20* (2006.01)
  *H01M 2/26* (2006.01)
  *H01M 2/02* (2006.01)
  *H01M 2/10* (2006.01)
  *H01M 10/42* (2006.01)
  *H01M 10/0525* (2010.01)

(52) U.S. Cl.
  CPC ......... *H01M 2/1072* (2013.01); *H01M 2/263* (2013.01); *H01M 10/4235* (2013.01); *H01M 10/0525* (2013.01); *H01M 2220/20* (2013.01)

(56) References Cited

U.S. PATENT DOCUMENTS

| | | | |
|---|---|---|---|
| 2009/0317717 A1* | 12/2009 | Ryu | H01M 2/26 429/211 |
| 2012/0088129 A1 | 4/2012 | Kaneda et al. | |
| 2012/0237809 A1* | 9/2012 | Ahn | H01M 2/263 429/94 |
| 2014/0023909 A1 | 1/2014 | Suzuki | |
| 2014/0186663 A1 | 7/2014 | Hiroki et al. | |
| 2015/0125721 A1 | 5/2015 | Yoon | |

FOREIGN PATENT DOCUMENTS

| | | |
|---|---|---|
| EP | 2693516 A1 | 2/2014 |
| JP | H05290878 A | 11/1993 |
| JP | 2001155790 A | 6/2001 |
| JP | 2004227818 A | 8/2004 |
| JP | 2011249269 A | 12/2011 |
| JP | 2012059489 A | 3/2012 |
| JP | 2014143186 A | 8/2014 |
| JP | 2014232666 A | 12/2014 |
| JP | 2015005496 A | 1/2015 |
| KR | 20030053547 A | 7/2003 |
| KR | 20130043734 A | 5/2013 |
| KR | 20150014668 A | 2/2015 |
| KR | 20150015321 A | 2/2015 |
| KR | 20150043093 A | 4/2015 |
| KR | 20150051142 A | 5/2015 |

OTHER PUBLICATIONS

Extended European Search Report including Written Opinion for EP 16873199 dated Jun. 7, 2018.
Chinese Search Report for Application No. 201680048475.5 dated Oct. 9, 2019, 1 page.

* cited by examiner

BATTERY CELL INCLUDING ELECTRODE LEAD CONTAINING GAS ADSORBENT

CROSS-REFERENCE TO RELATED APPLICATION(S)

The present application is a national stage entry under 35 U.S.C. § 371 of International Application No. PCT/KR/2016/009954 filed on Sep. 6, 2016, published in Korean, which claims priority from Korean Patent Application No. 10-2015-0175545 filed on Dec. 10, 2015 with the Korean Intellectual Property Office, all of which are incorporated herein by reference.

TECHNICAL FIELD

The present invention relates to a battery cell including an electrode lead containing a gas adsorbent.

BACKGROUND ART

Recently, in accordance with an increase in cost of an energy source due to exhaustion of fossil fuel and interest in environmental contamination, the demand for an eco-friendly alternative energy source has become an essential factor for future life. Therefore, research into various power generation technologies such as a nuclear power generation technology, a photovoltaic power generation technology, a wind power generation technology, a tidal power generation technology, and the like, has been continuously conducted, a power storage device for efficiently using energy produced as described above has also been interested.

Particularly, as the development of a technology and the demand for a mobile device have increased, the demand for a battery as an energy source has rapidly increased, and thus, various research into batteries capable of satisfying various requirements has been conducted.

Representatively, in view of a shape of the battery, a prismatic secondary battery and a pouch type secondary battery capable of being applied to a product such as a mobile phone, or the like, due to a thin thickness are in high demand, and in view of a material, lithium secondary batteries having advantages such as high energy density, a discharge voltage, output stability, for example, a lithium ion battery, a lithium ion polymer battery, and the like, are in high demand.

In addition, the secondary battery is classified depending on a structure of an electrode assembly in which a cathode, an anode, a separator interposed between the cathode and the anode are stacked. A representative example of the electrode assembly includes a jelly-roll type (winding type) electrode assembly having a structure in which long sheet-type cathodes and anodes are wound in a state in which a separator is interposed therebetween, a stacking type (laminate type) electrode assembly in which a plurality of cathodes and anodes cut at a predetermined size are sequentially stacked in a state in which a separator is interposed therebetween, and the like. Recently, in order to solve problems of the jell-roll type electrode assembly and the stacking type electrode assembly, as a more improved electrode assembly corresponding to a mixed form of the jelly-roll type electrode assembly and the stacking type electrode assembly, a stack/folding type electrode assembly having a structure in which unit cells obtained by stacking predetermined unit cathodes and anodes in a state in which a separator is interposed therebetween are sequentially wound in a state in which these unit cells are positioned on a separation film has been developed.

Further, depending on a shape of battery case, the secondary battery is classified into cylindrical and prismatic batteries in which electrode assemblies are embedded in cylindrical or prismatic metal cans, respectively, and a pouch type battery in which an electrode assembly is embedded in a pouch type case made of an aluminum laminate sheet.

In particular, recently, a pouch type battery having a structure in which a stacking type or stack/folding type electrode assembly is embedded in a pouch type battery case made of an aluminum laminate sheet has received much attention due to low manufacturing cost, a light weight, and ease of changing a shape, and the like, and a use amount of this pouch type battery has gradually increased.

Figure 1:
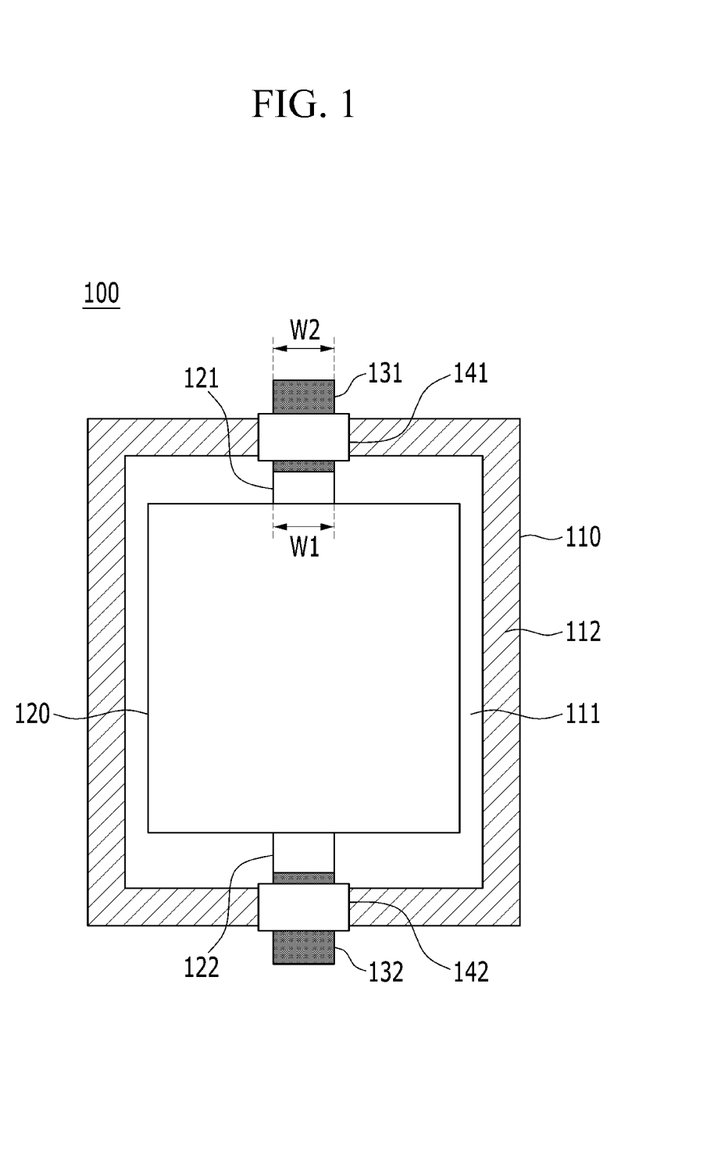
FIG. 1 is a mimetic view schematically illustrating a structure of a pouch type battery cell according to the related art.

FIG. 1 is a mimetic view schematically illustrating a structure of a pouch type battery cell according to the related art.

Referring to FIG. 1, a battery cell 100 has a structure in which outer peripheries 112 of a pouch type battery case 110 made of a laminate sheet are sealed by thermal bonding in a state in which an electrode assembly 120 is accommodated in an accommodation part 111 of the battery case 110.

The electrode assembly 120 includes cathode and anode tabs 121 and 122 protruding toward both outer peripheries opposing each other, wherein the cathode and anode tabs 121 and 122 are connected to cathode and anode leads 131 and 132, respectively, and the cathode and anode leads 131 and 132 protrude outwardly of the battery case 110 in a state in which the cathode and anode leads 131 and 132 are connected to the cathode and anode tabs 121 and 122, respectively.

The cathode and anode taps 121 and 122 have the same size as each other, and the cathode and anode leads 131 and 132 have the same size as each other.

One of main research projects in the battery cell as described above is to improve safety. For example, explosion of the battery may occur due to a high temperature and a high voltage in the battery which may be caused by an abnormal operation state of the battery cell, for example, an internal short-circuit of the battery cell, an overcharge state of the battery cell in which a current and voltage exceed an allowable current and voltage, exposure of the battery cell to a high temperature, deformation of the battery cell by dropping or external impacts, and the like.

Particularly, as one of the safety problems, when the internal short-circuit occurs in the battery cell due to exposure to a high temperature environment, malfunction, or the like, a decomposition reaction occurs in a cathode interface, and thus, a large amount of gas is generated. As a result, the battery case is ruptured due to an increase in internal pressure, such that the gas is discharged to the outside of the battery cell.

Generally, this internal gas includes components toxic to human bodies such as carbon monoxide, and the like, thereby causing a safety problem.

Therefore, a technology capable of basically solving this problem has been urgently required.

DISCLOSURE

Technical Problem

The present invention has been made in an effort to provide a battery cell including an electrode lead containing a gas adsorbent, having advantages of solving the problems in the related art and technical problems required to be solved from the past.

The present inventors conducted intensive studies and various experiments, and as described below, the present inventors confirmed that an effect of preventing problems such as rupture of a battery case due to gas generated in a battery cell and safety reduction due to discharge of the gas may be exhibited by coating a gas adsorbent on a tab connection part of an electrode lead, this effect may be significantly increased by allowing the tab connection part of the electrode lead to have a relatively large size as compared to an electrode tab to increase a coating area of the gas adsorbent, and since structural stability of the battery cell may be improved and the electrode lead and electrode tab may be more simply connected to each other by reinforcing mechanical rigidity of a connection portion between the electrode lead and electrode tab, it is possible to improve entire stability of the battery cell while preventing generation of a step to decrease a defect rate of a product, thereby completing the present invention.

Technical Solution

An exemplary embodiment of the present invention provides a battery cell including, an electrode assembly including an electrode tab protruding toward at least one outer periphery; a battery case including an accommodation part in which the electrode assembly is mounted; and an electrode lead connected to the electrode tab for electrical connection with an external device, wherein the electrode lead includes: a tab connection part electrically connected to the electrode tab; and a protrusion extension part extended from the tab connection part and protruding outwardly of the battery case to thereby be electrically connected to the external device, the tab connection part being coated with a gas adsorbent.

Therefore, problems such as rupture of the battery case due to gas generated in the battery cell and safety reduction caused by discharge of the gas may be prevented by the gas adsorbent coated on the tab connection part of the electrode lead.

Here, in order to maintain a stable connection state, the electrode lead and the electrode tab may be connected to each other by welding, more specifically, ultrasonic welding or laser welding.

As a specific example, the battery case may be a pouch type case made of a laminate sheet including a resin layer and a metal layer, and outer peripheries of the accommodation part in which the electrode assembly is mounted are sealed by thermal bonding.

As described above, since in a general pouch type battery cell, outer peripheral surfaces of a battery case made of a laminate sheet are sealed by thermal bonding, relative sealing force may be weak as compared to a prismatic battery cell or cylindrical battery cell, and when a pressure in the battery cell is increased by gas generated in the battery cell, thermally bonded outer peripheries may be relatively opened, such that gas may be easily discharged.

However, in the battery cell according to the present invention, the gas adsorbent may be coated on the tab connection part of the electrode lead electrically connected to the electrode tab, such that rupture of the battery case by the gas and discharge of the gas may be suppressed, and safety may be more improved.

Further, the gas adsorbent may be at least partially coated on the remaining portion of the tab connection part except for a portion of the tab connection part connected to the electrode tab.

When the gas adsorbent is coated on the portion of the tab connection part connected to the electrode tab, since the gas adsorbent is positioned on an interface between the tab connection part and the electrode tab, connection of the tab connection part and the electrode tab is not easy, and after connection, desired binding strength may not be exhibited, such that the tab connection part and the electrode tab may be separated by stimulation such as impact applied from the outside, or the like, such that a short-circuit may occur.

Therefore, this problem may be solved by at least partially coating the gas adsorbent on the other portions of the tab connection part except for the portion of the tab connection part connected to the electrode tab.

In addition, the tab connection part may have a structure in which the gas adsorbent is entirely coated on the remaining portion of the tab connection part except for a portion of the tab connection part connected to the electrode tab, such that the desired effect may be maximized through this structure.

In this case, the tab connection part may have a structure in which a predetermined unevenness is formed on a surface thereof so as to improve binding force with the gas adsorbent and/or the electrode tab.

Meanwhile, the tab connection part may have a structure in which a plurality of pores capable of being loaded with the gas adsorbent are formed therein.

That is, the gas adsorbent may be loaded in the pores formed in the tab connection part in addition to being coated on the surface of the tab connection part, and thus, a gas adsorption amount may be maximized.

In this case, an amount of the gas adsorbent contained in the pores may be in a range of 0.1 to 30% of an entire amount of the gas adsorbent coated on the tab connection part.

When the amount of the gas adsorbent contained in the pores is less than 0.1% of the entire amount of the gas adsorbent coated on the tab connection part, an increase in the gas adsorption amount may be excessively small as compared to the case in which the gas adsorbent is only coated, which is insignificant. On the contrary, when the amount of the gas adsorbent contained in the pores is more than 30%, the amount of the gas adsorbent contained in the tab connection part may be excessively large, such that mechanical rigidity of the tab connection part may be rather deteriorated, and it may be impossible to maintain a stable connection structure with the electrode tab.

Generally, gas generated by decomposition of an electrolyte in the battery cell may be oxygen, carbon monoxide (CO), and carbon dioxide ($CO_2$).

Therefore, the kind of gas adsorbent is not particularly limited as long as the gas adsorbent may easily adsorb gas generated in the battery cell in a large ratio to exhibit the desired effect. In detail, the gas adsorbent may be one or more selected from the group consisting of molecular sieves and metal ingredients having a gas adsorption property.

Here, the molecular sieve may be one or more selected from the group consisting of silica gel, carbon fiber, a porous carbon material, a porous metal oxide, a porous gel, and zeolite.

Here, the porous carbon material may be one or more selected from the group consisting of a carbon molecular sieve and activated carbon, and a metal material made of the porous metal oxide may be one or more selected from the group consisting of zeolite, silica gel, alumina, and a molecular sieve.

Further, the metal ingredient may be one or more selected from the group consisting of nickel (Ni), platinum (Pt), palladium (Pd), calcium (Ca), strontium (Sr), barium (Ba), thallium (Tl), zirconium (Zr), hafnium (Hf), vanadium (V), niobium (Nb), tantalum (Ta), chromium (Cr), molybdenum (Mo), and tungsten (W).

As a specific example, the tab connection part may have a structure in which a width thereof in a width direction perpendicular to a protrusion direction of the electrode tab is relatively large as compared to the electrode tab.

Generally, since a pouch type battery cell may not exhibit sufficiently strong strength due to characteristics of a material of a battery case made of a laminated sheet, it is impossible to stably protect an electrode assembly accommodated in the battery case from impact applied from the outside, such that there is a limitation in exhibiting the desired structural stability.

However, since in the battery cell according to the present invention, the tab connection part of the electrode lead electrically connected to the electrode tab has a relatively large size as compared to the electrode tab, rigidity for an outer periphery of a portion to which the electrode tab protrudes may be effectively reinforced.

Further, an effect of adsorbing gas generated in the battery cell may be significantly increased by maximizing an area of the tab connection part coated with the gas adsorbent through the above-mentioned structure, and thus, safety may be improved.

Meanwhile, the width of the tab connection part in the width direction perpendicular to the protrusion direction of the electrode tab may be smaller than a width of the accommodation part of the battery case corresponding thereto.

More specifically, the tab connection part may have a structure in which the width thereof in the width direction perpendicular to the protrusion direction of the electrode tab is relatively large as compared to the electrode tab, but is smaller than the width of the accommodation part of the battery case corresponding thereto, such that the tab connection part may be more easily and stably positioned in the accommodation part of the battery case during a process of manufacturing the battery cell.

As a specific example, the tab connection part may be at least partially positioned at a thermally bonded outer periphery of the battery case.

In more detail, the outer periphery at which the tab connection part is partially positioned may be a thermally bonded outer periphery at which the protrusion extension part of the electrode lead is positioned to protrude or at least one of thermally bonded outer peripheries of both side surfaces of the battery case.

Here, the thermally bonded outer peripheries of both side surfaces, which are thermally bonded outer peripheries continuously formed from both end portions of the thermally bonded outer periphery at which the protrusion extension part is positioned, mean thermally bonded outer peripheries positioned in the width direction perpendicular to a protrusion direction of the protrusion extension part.

Therefore, the tab connection part may maintain a state in which the tab connection part is stably fixed to a portion of the thermally bonded outer periphery of the battery case during a process of sealing the outer periphery of the battery case by thermal bonding, thereby making it possible to effectively prevent an internal short-circuit or structural damage capable of occurring by a direct contact with the electrode assembly while the tab connection part flows in the battery case.

Further, when the tab connection part is partially positioned at the thermally bonded outer periphery in the protrusion direction of the protrusion extension part, an effect of more stably mounting electrical connection members such as PCM, and the like, mounted on the sealing part may be exhibited by improving structural stability for a sealing part formed by thermal bonding in the portion of the outer periphery.

As a specific example, the tab connection part may be formed to have a length at which both end portions thereof in the width direction perpendicular to the protrusion direction of the electrode tab reach the thermally bonded outer peripheries of both side surfaces of the battery case, respectively.

Therefore, the tab connection part may be more stably positioned in the battery case by maintaining a state in which both end portions of the tab connection part in the width direction perpendicular to the protrusion direction of the electrode tab are fixed to the thermally bonded outer peripheries of both side surfaces of the battery case.

In this case, an insulating film may be interposed between both end portions of the tab connection part and the thermally bonded outer peripheries of both side surfaces of the battery case so as to improve a sealing property at the time of thermal bonding.

Generally, a material of the electrode lead may be the same as that of the electrode tab so as to implement stable electrical connection while exhibiting stable binding force with the electrode tab. In more detail, as a material having conductivity without causing chemical changes in the battery, stainless steel, aluminum, nickel, titanium, baked carbon, or a material obtained by surface treating an aluminum or stainless steel surface with carbon, nickel, titanium, silver, or the like, may be used.

On the contrary, an inner most portion of the battery case may be formed of a heat-fusible resin sealant layer so as to exhibit the sealing property at the time of thermal bonding.

Therefore, portions of the tab connection part and the battery case facing each other at the time of thermal bonding of the outer peripheries of the battery case may be made of different materials from each other, and thus, sealing force at the time of thermal bonding may be improved by interposing the insulating film between both end portions of the tab connection part and the thermally bonded outer peripheries of both side surfaces of the battery case.

Further, the insulating film may also be interposed between the tab connection part and the thermally bonded outer peripheries so as to improve sealing force at the time of thermal bonding even in a case in which the tab connection part is partially positioned at the thermally bonded outer periphery in the protrusion direction of the protrusion extension part.

As a specific example, the tab connection part may have a structure in which a length thereof in the same direction as the protrusion direction of the electrode tab may be 10 to 90% of a protrusion length of the electrode tab.

When the length of the tab connection part is less than 10% of the protrusion length of the electrode tab, a connection area between the tab connection part and the electrode tab is not sufficiently secured, such that desired binding force may not be exhibited. On the contrary, when the length of the tab connection part is more than 90% of the protrusion length of the electrode tab, the tab connection part may directly come in contact with the electrode assembly after being connected to the electrode tab, such that an internal short-circuit may occur, or the electrode assembly or tab connection part may be structurally damaged.

Meanwhile, the electrode tab may have a structure in which a width thereof in the width direction perpendicular to the protrusion direction is the same as a distance between outer peripheries of the electrode assembly corresponding thereto.

Generally, an electrode tab may be formed by notching a non-coated portion of an electrode sheet.

In this case, the notching is performed by a pressing method using a mold, and a defect that the non-coated portion on which an electrode active material is not applied is included in an outer periphery of an electrode adjacent to the electrode tab may occur due to a step generated by this pressing process.

However, since the electrode tab of the battery cell according to the present invention has a structure in which the width thereof in the width direction perpendicular to the protrusion direction is the same as the distance between the outer peripheries of the electrode assembly corresponding thereto and the portion of the outer periphery in which the electrode tab is formed is entirely formed of the non-coated portion on which the electrode active material is not applied, the defect described above may not occur.

Further, since the electrode tab is formed to have a wider structure as compared to an electrode tab of a battery cell according to the related art, a connection portion with the tab connection part by welding may be further widened, and thus, more higher binding force may be exhibited between the electrode tab and the tab connection part.

Further, due to the structure of the electrode tab, a current flowing in a process of charging/discharging the battery cell may flow through the electrode tab having a more wide area. Therefore, it is possible to significantly decrease heat generated in the connection portion between the electrode tab and the electrode lead to prevent degradation of the battery cell and improve stability.

As a specific example, the electrode tab may include electrode tabs having different polarities from each other and protruding toward outer peripheries of the battery case opposing each other.

Therefore, the tab connection parts having wide structures may be more easily connected to the electrode tabs depending on their polarities, respectively, without mutual interferences.

However, a protrusion structure of the electrode tabs is not limited thereto. As another specific example, the electrode tabs may also have a structure in which electrode tabs having different polarities from each other protrude toward the same outer periphery of the battery case as each other.

In this case, the electrode tabs may have a structure in which an insulator is interposed between tab connection parts of the electrode leads connected to the electrode tabs.

As described above, generally, the electrode lead may be formed of the same material as that of the electrode tab. Therefore, when the tab connection parts of the electrode leads connected to the electrode tabs having different polarities from each other, respectively, directly come in contact with each other, an internal short-circuit may occur.

Therefore, the insulator may be interposed between the tab connection parts of the electrode leads connected to the electrode tabs having different polarities to each other, respectively, thereby making it possible to prevent a direct contact between the tab connection parts to prevent problems caused by the direct contact.

Here, the kind of material interposed between the tab connection parts is not limited to the insulator as long as it may stably insulate the tab connection parts connected to the electrode tabs having different polarities from each other. In more detail, the same effect may also be exhibited by coating an insulating material on surfaces of the tab connection parts facing each other.

Further, an insulating film may be interposed between the protrusion extension part of the electrode lead and the thermally bonded outer periphery of the battery case, similarly between the tab connection part and the thermally bonded outer periphery of the battery case, such that sealing force at the time of thermal bonding may be improved.

Meanwhile, a structure of the battery cell according to the present invention is not particularly limited as long as the structure may maintain a stable connection state with the electrode lead in a state in which the electrode assembly is accommodated in the accommodation part of the battery case, as a structure including an electrode tab protruding toward at least one outer periphery of the battery cell. In detail, the battery cell may have a winding structure, a stacking structure, a stack/folding type structure or stack/lamination structure.

Further, the kind of battery cell according to the present invention is not particularly limited, but as a specific example, the battery cell may be a lithium secondary battery having advantages such as a high energy density, a high discharge voltage, and high output stability, and the like, for example, a lithium ion battery, a lithium ion polymer battery, or the like.

Generally, the lithium secondary battery includes a cathode, an anode, a separator, and a lithium salt-containing non-aqueous electrolyte.

The cathode may be prepared by applying a mixture of a cathode active material, a conductive material, and a binder on a cathode current collector and then drying the applied mixture, and if necessary, a filler may be further added to the mixture.

Examples of the cathode active material may include layered compounds such as lithium cobalt oxide ($LiCoO_2$) and lithium nickel oxide ($LiNiO_2$), or compounds substituted with one or more transition metals; lithium manganese oxides such as compounds represented by Chemical Formula $Li_{1+x}Mn_{2-x}O_4$ (here, x is in a range of 0 to 0.33), $LiMnO_3$, $LiMn_2O_3$, and $LiMnO_2$; lithium copper oxide ($Li_2CuO_2$); vanadium oxides such as $LiV_3O_8$, DeletedTexts $V_2O_5$ and $Cu_2V_2O_7$; Ni-site type lithium nickel oxides represented by Chemical Formula $LiNi_{1-x}M_xO_2$ (here, M is Co, Mn, Al, Cu, Fe, Mg, B, or Ga, and x is in a range of 0.01 to 0.3); lithium manganese composite oxides represented by Chemical Formula $LiMn_{2-x}M_xO_2$ (here, M is Co, Ni, Fe, Cr, Zn, or Ta, and x is in a range of 0.01 to 0.1), or Chemical Formula $Li_2Mn_3MO_8$ (here, M is Fe, Co, Ni, Cu, or Zn); $LiMn_2O_4$ wherein a portion of Li is substituted with alkaline earth metal ions; disulfide compounds; $Fe_2(MoO_4)_3$, and the like, but are not limited thereto.

Generally, the conductive material may be added in an amount of 1 to 30 wt % based on a total weight of the mixture containing the cathode active material. Any conductive material may be used without particular limitation as long as it has suitable conductivity without causing chemical changes in the battery. Examples of the conductive material may include graphite such as natural graphite or artificial graphite; carbon black such as carbon black, acetylene black, Ketjen black, channel black, furnace black, lamp black, and thermal black; conductive fibers such as carbon fibers and metallic fibers; metallic powders such as carbon fluoride powders, aluminum powders, and nickel powders; conductive whiskers such as zinc oxide and potassium titanate; conductive metal oxides such as titanium oxide; and conductive materials such as polyphenylene derivatives, and the like.

The binder, which is a component assisting in binding between an active material, a conductive material, and the like, and in binding with a current collector, may be generally added in an amount of 1 to 30 wt %, based on the total weight of the mixture containing the cathode active material. Examples of the binder as described above may include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butylene rubber, fluorine rubber, various copolymers, and the like.

The filler, which is a component suppressing expansion of a cathode, may be selectively used, and is not particularly limited as long as it does not cause chemical changes in the battery and is a fibrous material. Examples of the filler may include olefin based polymers such as polyethylene and polypropylene; and fibrous materials such as glass fiber and carbon fiber.

The anode may be prepared by applying an anode active material onto an anode current collector and drying the applied anode active material, and if necessary, the above-mentioned components may be selectively and additionally contained in the anode.

Examples of the anode active material may include carbon such as hard carbon and graphite based carbon; metal composite oxides such as DeletedTexts ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, Group I, II and III elements of the Periodic Table, or halogens; $0 < x \leq 1$; $1 \leq y \leq 3$; and $1 \leq z \leq 8$); a lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; Li—Co—Ni based materials, and the like.

The separator and separation film are interposed between the cathode and the anode, and an insulating thin film having high ion permeability and mechanical strength may be used. Generally, the separator may have a pore diameter of 0.01 to 10 μm and a thickness of 5 to 300 μm. As the separator, sheets, non-woven fabrics, or the like, made of an olefin-based polymer such as polypropylene, or the like; glass fibers or polyethylene, or the like, which have chemical resistance and hydrophobicity, may be used. When a solid electrolyte such as a polymer is used as the electrolyte, the solid electrolyte may also serve as the separator.

Further, as a specific example, in order to improve safety of a battery having a high energy density, the separator and/or the separation film may be an organic/inorganic composite porous safety-reinforcing separator (SRS).

The SRS separator is prepared using inorganic particles and a binder polymer as active layer components on a polyolefin-based separator substrate. Here, the SRS separator may have a uniform pore structure formed by interstitial volume among inorganic particles corresponding to the active layer component in addition to a pore structure included in the separator substrate itself.

In a case of using the organic/inorganic composite porous separator as described above, there is an advantage in that an increase in a battery thickness caused by swelling during a formation process may be suppressed as compared to the case of using a general separator. Further, in a case of using a gelable polymer as a binder polymer component during impregnation of a liquid electrolyte, the separator may also be used as an electrolyte at the same time.

In addition, since the organic/inorganic composite porous separator may exhibit excellent adhesion characteristics by controlling contents of the inorganic particles and the binder polymer corresponding to the active layer components of the separator, a battery assembly process may be easily carried out.

The inorganic particles are not particularly limited as long as they are chemically stable. That is, the inorganic particles capable of being used in the present invention are not particularly limited as long as oxidation and/or reduction reactions do not occur in an operating voltage range (e.g., 0 to 5V based on Li/Li+) of a battery to which the inorganic particles are applied. Particularly, in a case of using inorganic particles having an ion transfer ability, t is possible to increase ion conductivity in an electrochemical element, thereby improving the performance of the battery. Consequently, it is preferable that ion conductivity of the inorganic particles be as high as possible. Further, in a case in which the inorganic particles have a high density, it may be difficult to disperse the inorganic particles at the time of coating, and a weight of the battery may increase at the time of manufacturing the battery. Therefore, it is preferable that the density of the inorganic particles be as low as possible. In addition, in a case in which the inorganic particles have high permittivity, the inorganic particle may contribute to increasing a degree of dissociation of an electrolyte salt, such as a lithium salt, in a liquid electrolyte, thereby improving ion conductivity of the electrolyte.

The lithium salt-containing non-aqueous electrolyte may be composed of a polar organic electrolyte and a lithium salt. As the electrolyte, a non-aqueous liquid electrolyte, an organic solid electrolyte, an inorganic solid electrolyte, and the like, may be used.

Examples of the non-aqueous liquid electrolyte may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, polymers containing ionic dissociation groups, and the like.

Examples of the inorganic solid electrolyte may include Li nitrides, halides, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

The lithium salt may be a material that is readily soluble in the non-aqueous electrolyte, and examples thereof may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide, and the like.

Further, in order to improve charge/discharge characteristics, flame retardancy, and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, may be added to the non-aqueous electrolyte. In some cases, in order to impart incombustibility, the non-aqueous electrolyte may also further contain a halogen-containing solvent such as carbon tetrachloride and ethylene trifluoride, and in order to improve high-temperature storage characteristics, the electrolyte may also further contain carbon dioxide gas.

Another embodiment of the present invention provides a battery pack including at least one battery cell described above; and a device including the battery pack described above. The device may be any one selected from the group consisting of a portable phone, a tablet computer, a notebook computer, a power tool, a wearable electronic device, an electric vehicle, a hybrid electric vehicle, a plug-in hybrid electric vehicle, and an electric power storage device.

The above-mentioned devices and apparatus are known in the art, a detailed description thereof will be omitted in the present specification.

MODE FOR INVENTION

Hereinafter, the present invention will be described in more detail with reference to the accompanying drawings according to exemplary embodiments of the present invention, but the scope of the present invention is not limited thereto.

Figure 2:
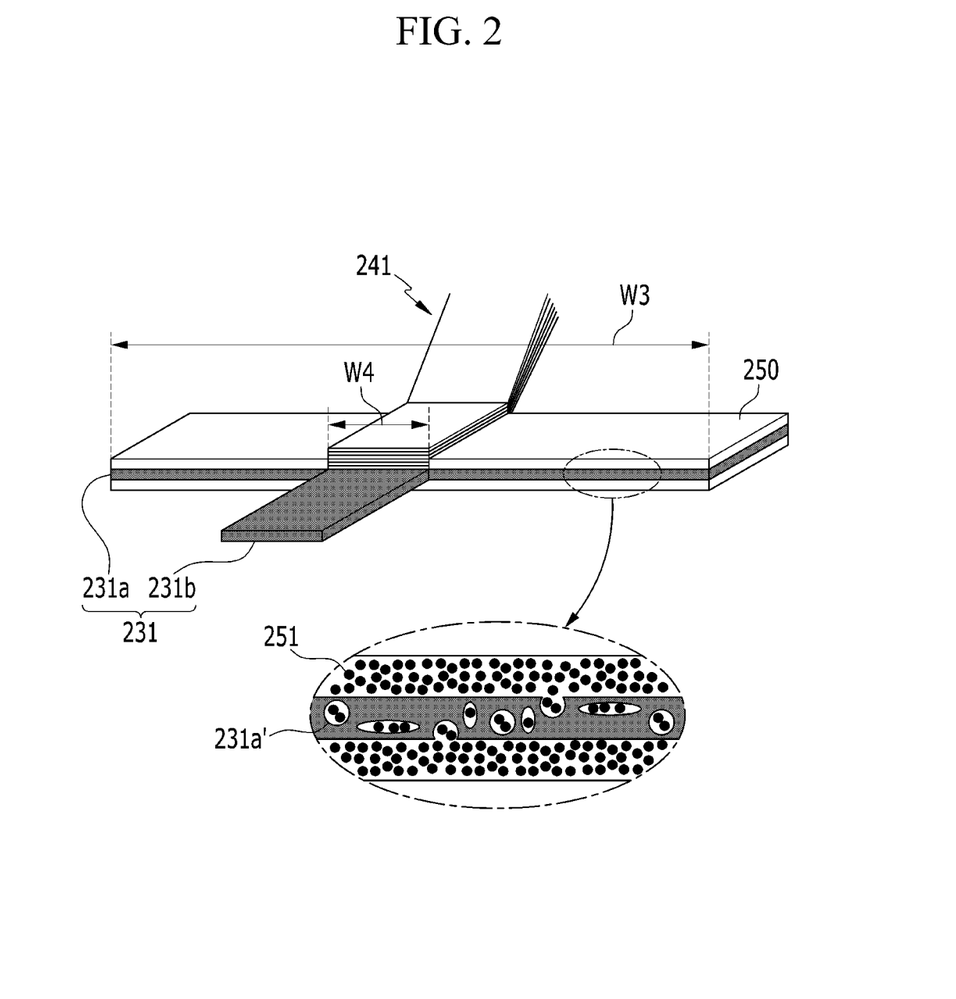
FIG. 2 is a mimetic view schematically illustrating structures of a cathode tab and a cathode lead of a battery cell according to an exemplary embodiment of the present invention.

FIG. 2 is a mimetic view schematically illustrating structures of a cathode tab and a cathode lead of a battery cell according to an exemplary embodiment of the present invention.

Referring to FIG. 2, a cathode lead 231 includes a tab connection part 231a and a protrusion extension part.

The tab connection part 231a has a structure in which a width W3 thereof in a width direction perpendicular to a protrusion direction of a cathode tab 241 is relatively large as compared to a width W4 of the cathode tab 241, and the cathode tab 241 is bonded to a central portion of the tab connection part 231a by welding.

A gas adsorbent coating layer 250 is entirely formed on the remaining portions of upper and lower surfaces of the tab connection part 231a except for a portion of the tab connection part 231a connected to the cathode tab 241.

A plurality of pores 231a' are formed in the tab connection part 231a, and a gas adsorbent 251 coated on the tab connection part 231a is partially loaded in the pores 231a'.

Therefore, gas generated in the battery cell may be easily removed by the gas adsorbent, and a swelling phenomenon and a stability reduction problem caused by the gas may be prevented.

The protrusion extension part 231b has a structure integrated with the tab connection part 231a, and protrudes and is extended from the portion of the tab connection part 231a corresponding to a protrusion portion of the cathode tab 241 in the protrusion direction of the cathode tab 241.

Figure 3:
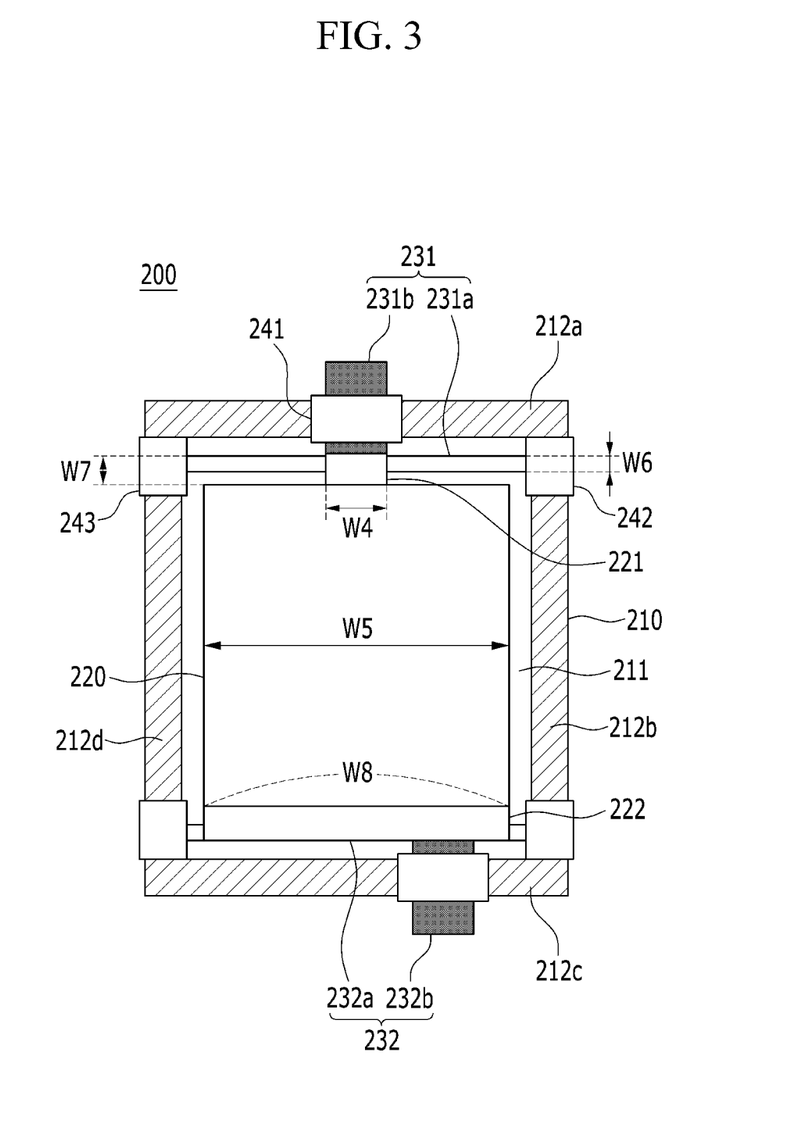
FIG. 3 is a mimetic view schematically illustrating a structure of the battery cell to which the cathode tab and the cathode lead of FIG. 2 are applied.

FIG. 3 is a mimetic view schematically illustrating a structure of the battery cell to which the cathode tab and the cathode lead of FIG. 2 are applied.

Referring to FIG. 3, a battery cell 200 has a structure in which outer peripheries 212a, 212b, 212c, and 212d of a pouch type battery case 210 made of a laminate sheet are sealed by thermal bonding in a state in which an electrode assembly 220 is accommodated in an accommodation part 211 of the battery case 210.

The electrode assembly 220 includes cathode and anode tabs 241 and 222 protruding toward upper and lower outer peripheries 212a and 212c opposing each other, respectively.

The cathode tab 241 has a structure in which the width W4 thereof in the width direction perpendicular to the protrusion direction is smaller than a width W5 of the electrode assembly 220 having a rectangular shape, and is electrically connected to the cathode lead 231.

The cathode lead 231 includes the tab connection part 231a and the protrusion extension part 231b.

The tab connection part 231a is bonded to the cathode tab 241 by welding, and formed to have a length at which both end portions of the tab connection part 231a in the width direction perpendicular to the protrusion direction of the cathode tab 241 reach the thermally bonded outer peripheries 212b and 212d of both side surfaces of the battery case 210, respectively.

Therefore, both end portions of the tab connection part 231a are positioned at the thermally bonded outer peripheries 212b and 212d of both side surfaces of the battery case 210, respectively, and insulating films 242 and 243 are interposed between both end portions of the tab connection part 231a and the thermally bonded outer peripheries 212b and 212d of both side surfaces of the battery case 210, respectively, in order to improve sealing force at the time of thermal bonding.

Therefore, a step generated when connection positions of the cathode lead 231 and the cathode tab 241 are dislocated at the time of bonding the cathode tab 241 to the cathode lead 231, and a problem caused by the step may be prevented.

A length W6 of the tab connection part 231a in the same direction as the protrusion direction of the cathode tab 241 is about 60% of a protrusion length W7 of the cathode tab 241.

Therefore, the tab connection part 231a is stably fixed, such that an internal short-circuit or structural damage due to a direct contact between the tab connection part 231a and the electrode assembly 220 may be prevented.

The protrusion extension part 231b is formed integrally with the tab connection part 231a and protrudes toward a portion of a thermally bonded outer periphery 212a of an upper portion of the battery case 210 corresponding to the protrusion portion of the cathode tab 241, and an insulating film 241 is interposed between the protrusion extension part 231b and the thermally bonded outer periphery 212a of the upper portion of the battery case 210 in order to improve sealing force at the time of thermal bonding.

The anode tab 222 has a structure in which a width W8 thereof in the width direction perpendicular to the protrusion direction is the same as the width W5 of the electrode assembly 220 having a rectangular shape, and is electrically connected to the anode lead 232.

Therefore, heat generated in a binding site between the anode tab 222 and a tab connection part 232a of the anode lead 232 may be effectively removed through the anode tab 222 having a wide area.

Since the anode lead 232 has the same structure as that of the cathode lead 231 except that a protrusion extension part 232b is positioned adjacently to a thermally bonded outer periphery 212b of one side surface of the battery case 210 in a portion of a thermally bonded outer periphery 212c of a lower portion of the battery case 210, a detailed description thereof will be omitted.

Figure 4:
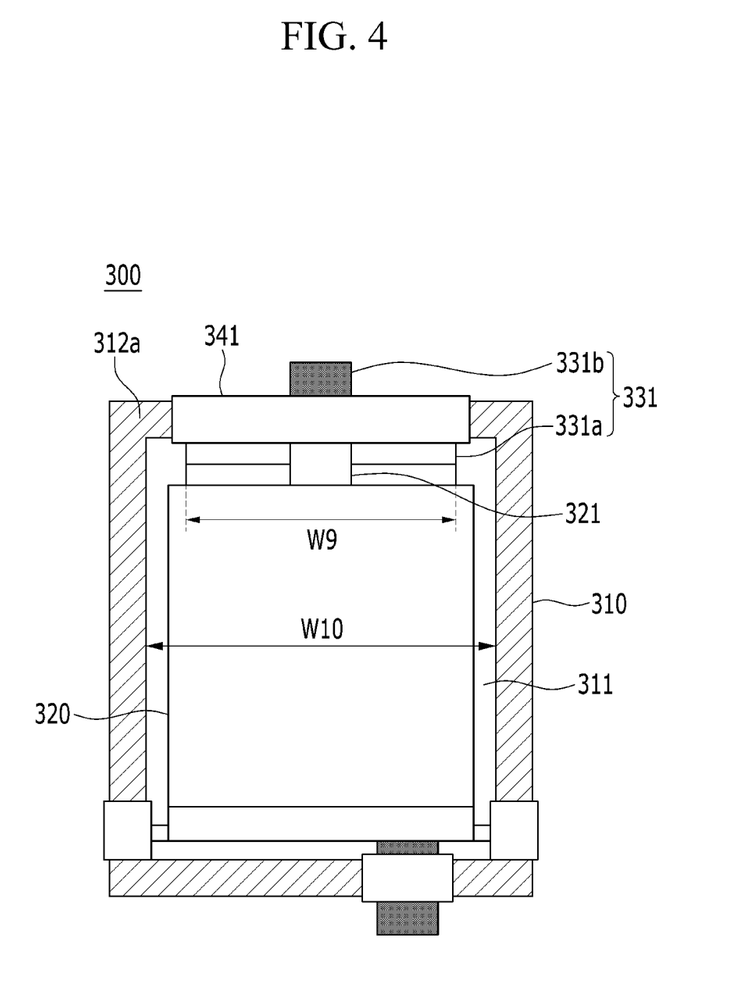
FIG. 4 is a mimetic view schematically illustrating a structure of a battery cell according to another exemplary embodiment of the present invention.

FIG. 4 is a mimetic view schematically illustrating a structure of a battery cell according to another exemplary embodiment of the present invention.

Referring to FIG. 4, a width W9 of a tab connection part 331a of a cathode lead 331 of a battery cell 300 in a width direction perpendicular to a protrusion direction of a cathode tab 321 is smaller than a width W10 of an accommodation part 311 of a battery case 310.

The tab connection part 331a of the cathode lead 331 is partially positioned at a thermally bonded outer periphery 312a of an upper portion of the battery case 310 to which a protrusion extension part 331b protrudes, and an insulating film 341 is interposed between the tab connection part 331a and the protrusion extension part 331b of the cathode lead 331 and the thermally bonded outer periphery 312a of the upper portion of the battery case 310 and so as to improve sealing force at the time of thermal bonding.

Therefore, a state in which the cathode lead 331 is stably fixed in the battery case 310 may be maintained.

Since the rest of the structure of the battery cell except for the above mentioned structure is the same as that of the battery cell 200 of FIG. 3, a detailed description thereof will be omitted.

Figure 5:
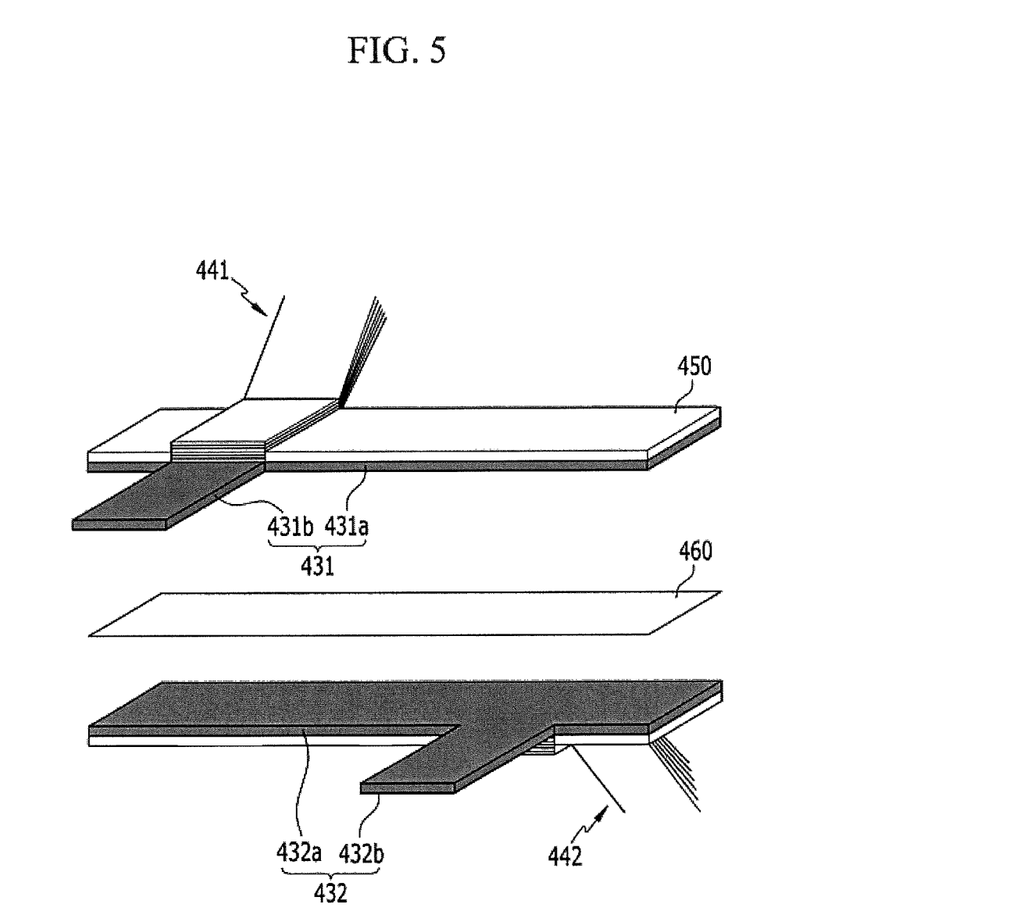
FIG. 5 is a mimetic view schematically illustrating structures of cathode and anode leads of a battery cell according to another exemplary embodiment of the present invention.

FIG. 5 is a mimetic view schematically illustrating structures of cathode and anode leads of a battery cell according to another exemplary embodiment of the present invention.

Referring to FIG. 5, cathode and anode tabs 441 and 442 protrude in the same direction as each other.

The cathode tab 441 is bonded to a tab connection part 431a of a cathode lead 431 on an upper surface of the cathode lead 431, and the anode tab 442 is bonded to a tab connection part 432a of an anode lead 432 on a lower surface of the anode lead 432.

A gas adsorbent coating layer 450 is entirely formed on the remaining portions of an upper surface of the tab connection part 431a of the cathode lead 431 and a lower surface of the tab connection part 432a of the anode lead 432 except for portions of the upper surface of the tab connection part 431a of the cathode lead 431 and the lower surface of the tab connection part 432a of the anode lead 432 connected to the cathode tab 441 and the anode tab 442, respectively.

A protrusion extension part 431b of the cathode lead 431 is integrated with the tab connection part 431a, and positioned at a portion corresponding to a protrusion portion of the cathode tab 441.

A protrusion extension part 432b of the anode lead 432 is integrated with the tab connection part 432a, and positioned at a portion corresponding to a protrusion portion of the anode tab 442.

The tab connection part 431a of the cathode lead 431 and the tab connection part 432a of the anode lead 432 are formed at the same size as each other, and an insulator 460 is interposed between the tab connection part 431a of the cathode lead 431 and the tab connection part 432a of the anode lead 432.

Therefore, since the cathode lead 431 and the anode lead 432 do not directly come in contact with each other, the cathode lead 431 and the anode lead 432 may prevent problems such as an internal short-circuit caused by a direct contact and be easily applied to a structure in which the cathode tab 441 and the anode tab 442 protrude in the same direction as each other, thereby exhibiting the desired effect.

Those skilled in the art will appreciate that various applications and modifications are possible based on this description, without departing from the scope and spirit of the invention as disclosed in the accompanying claims.

INDUSTRIAL APPLICABILITY

As described above, in a battery cell according to the present invention, an effect of preventing problems such as rupture of a battery case due to gas generated in a battery cell and safety reduction due to discharge of the gas may be exhibited by coating a gas adsorbent on a tab connection part of an electrode lead, this effect may be significantly increased by allowing the tab connection part of the electrode lead to have a relatively large size as compared to an electrode tab to increase a coating area of the gas adsorbent, and since structural stability of the battery cell may be improved and the electrode lead and electrode tab may be more simply connected to each other by reinforcing mechanical rigidity of a connection portion between the electrode lead and electrode tab, it is possible to improve entire stability of the battery cell while preventing generation of a step to decrease a defect rate of a product.

The invention claimed is:

1. A battery cell comprising:
   a battery case;
   an electrode assembly mounted in an accommodation part of the battery case, the electrode assembly including an electrode tab protruding toward an outer periphery of the battery case; and
   an electrode lead connected to the electrode tab for electrical connection with an external device,
   wherein the electrode lead includes:
      a tab connection part electrically connected to the electrode tab; and
      a protrusion extension part extending from the tab connection part and protruding through the outer periphery to an outside of the battery case, the tab connection part having a first portion that is coated with a gas adsorbent and a second portion that is devoid of the gas adsorbent, the electrode tab being connected to the tab connection part at the second portion.

2. The battery cell of claim 1, wherein: the battery case is a pouch type case made of a laminate sheet including a resin layer and a metal layer, and outer peripheries of the accommodation part in which the electrode assembly is mounted are sealed by thermal bonding.

3. The battery cell of claim 1, wherein: the gas adsorbent is entirely coated on the remaining portion of the tab connection part except for a portion of the tab connection part connected to the electrode tab.

4. The battery cell of claim 1, wherein: a plurality of pores loaded with the gas adsorbent are formed in the tab connection part.

5. The battery cell of claim 4, wherein: an amount of the gas adsorbent contained in the pores is in a range of 0.1 to 30% of an entire amount of the gas adsorbent coated on the tab connection part.

6. The battery cell of claim 1, wherein: the gas adsorbent is one or more selected from the group consisting of molecular sieves and metal ingredients, which have a gas adsorption property.

7. The battery cell of claim 6, wherein: the molecular sieve is one or more selected from the group consisting of silica gel, carbon fiber, a porous carbon material, a porous metal oxide, a porous gel, and zeolite.

8. The battery cell of claim 7, wherein: the porous carbon material is one or more selected from the group consisting of a carbon molecular sieve and activated carbon.

9. The battery cell of claim 7, wherein: a metal material made of the porous metal oxide is one or more selected from the group consisting of zeolite, silica gel, alumina, and a molecular sieve.

10. The battery cell of claim 1, wherein: a width of the tab connection part in a width direction perpendicular to a protrusion direction of the electrode tab is relatively large as compared to the electrode tab.

11. The battery cell of claim 1, wherein: a width of the tab connection part in a width direction perpendicular to a protrusion direction of the electrode tab is smaller than a width of the accommodation part of the battery case corresponding thereto.

12. The battery cell of claim 1, wherein: the tab connection part is at least partially positioned at a thermally bonded outer periphery of the battery case.

13. The battery cell of claim 1, wherein: the tab connection part is formed to have a length at which both end portions thereof in a width direction perpendicular to a protrusion direction of the electrode tab reach thermally bonded outer peripheries of both side surfaces of the battery case, respectively.

14. The battery cell of claim 13, wherein: an insulating film is interposed between both end portions of the tab connection part and the thermally bonded outer peripheries of both side surfaces of the battery case so as to improve a sealing property at the time of thermal bonding.

15. The battery cell of claim 1, wherein: a width of the electrode tab in a width direction perpendicular to a protrusion direction is the same as a distance between outer peripheries of the electrode assembly corresponding thereto.

16. The battery cell of claim 1, wherein: the electrode tab includes electrode tabs having different polarities from each other and protruding toward outer peripheries of the battery case opposing each other.

17. The battery cell of claim 1, wherein: the electrode tab includes electrode tabs having different polarities from each other and protruding toward the same outer periphery of the battery case as each other.

18. The battery cell of claim 17, wherein: an insulator is interposed between tab connection parts of the electrode leads connected to the electrode tabs.

19. A battery pack comprising the battery cell of claim 1.

* * * * *